United States Patent

[11] 3,547,258

[72] Inventor Billy B. Black
3215 Brickyard Road, Topeka, Kans. 66618
[21] Appl. No. 782,235
[22] Filed Dec. 9, 1968
[45] Patented Dec. 15, 1970

[54] ADJUSTABLE PALLET AND METHOD FOR SHIPPING AND STORING VEHICLE TIRES
9 Claims, 9 Drawing Figs.
[52] U.S. Cl..................................................... 206/65,
211/175, 214/10.5
[51] Int. Cl..................................................... A47f 5/10,
A47f 7/04; B65d 57/00, B65d 71/00, B65d 85/06; B65g 1/14
[50] Field of Search.......................................... 206/65,
46(Tire), 62; 214/10.5; 53/197; 220/84; 211/175

[56] References Cited
UNITED STATES PATENTS
| | | | |
|---|---|---|---|
| 1,476,319 | 12/1923 | Angier | 206/46(TIRE) |
| 1,917,764 | 7/1933 | Howie | 220/84 |
| 2,476,753 | 7/1949 | Miller | 214/10.5 |
| 2,877,602 | 3/1959 | Larsen | 211/175 |
| 2,921,423 | 1/1960 | Cover et al. | 53/197 |
| 3,147,860 | 9/1964 | Kean, Sr., et al. | 206/62 |
| 3,313,081 | 4/1967 | Squire | 220/84(UX) |

*Primary Examiner*—William T. Dixson, Jr
*Attorney*—Fishburn, Gold and Litman

ABSTRACT: An adjustable material-handling pallet has a base panel extending between upright end panels. The base panel has a plurality of telescoping members and the end panels each have a plurality of telescoping uprights and telescoping transverse members whereby the pallet is adjustable in height and width and length. The pallet is particularly adaptable to be used for vehicle tires wherein a plurality of vehicle tires are placed therein in a row extending between the end panels and the length of the pallet is then reduced thereby compressing the tires therein for shipping and storing. For storage the tires preferably are partially decompressed by a desired lengthening of the pallet whereby the tires will readily return to normal shape when removed from the pallet. The length of the pallet is extended to release the tires when it is desired to remove one or more tires.

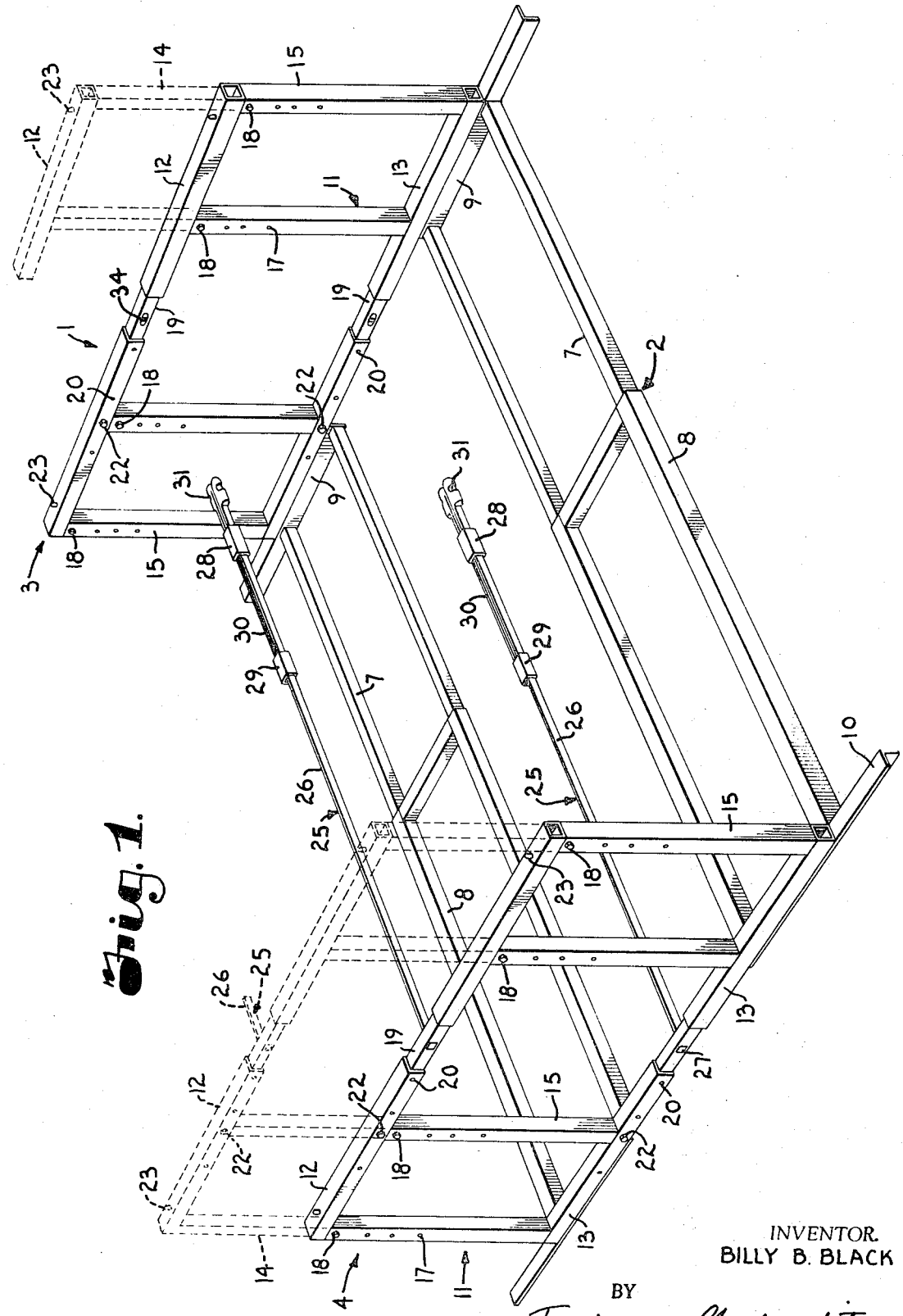

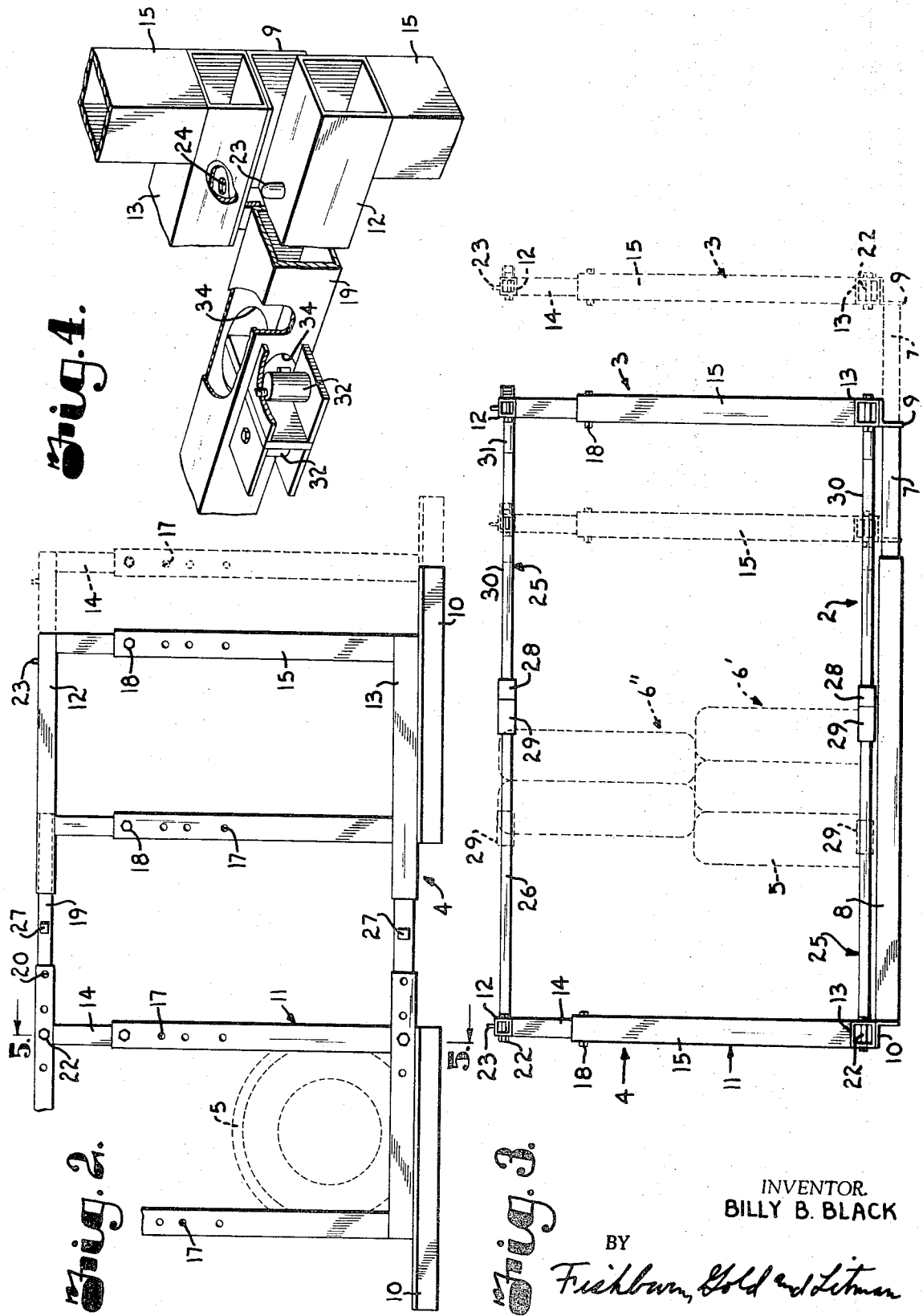

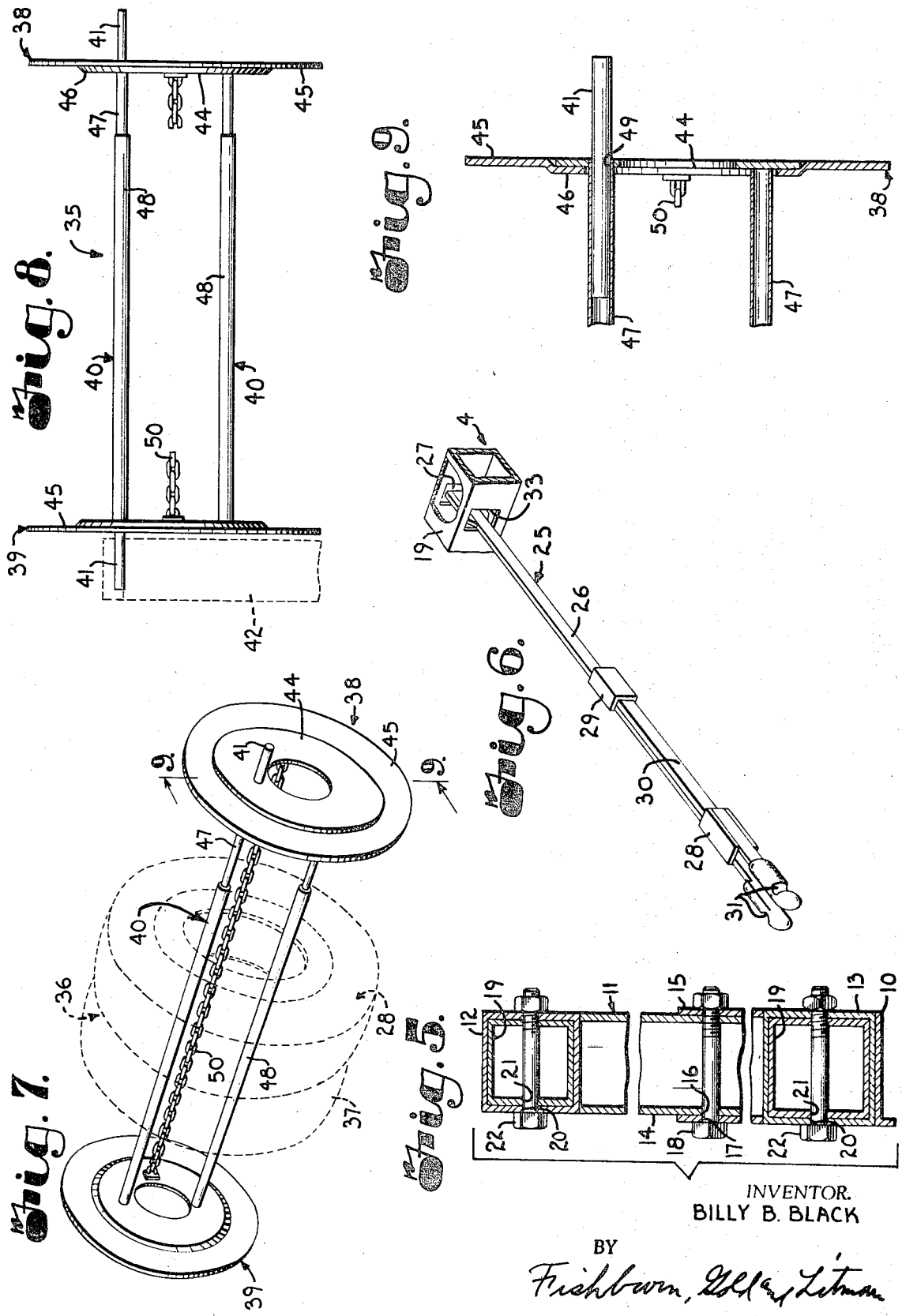

3,547,258

ADJUSTABLE PALLET AND METHOD FOR SHIPPING AND STORING VEHICLE TIRES

This invention relates to adjustable material-handling pallets and more particularly to adjustable pallets adapted for use in storing and shipping vehicle tires.

The methods of transporting uncompressed tires involves laced loading wherein the tires are handled individually. For example, the first tire in a row is placed flat to one side of the boxcar, truck bed, or the like and other tires are placed with the tread on the floor and with an upper half extending over and laying on the previously placed tire. Tires may also be placed on suitable pallets with upright frames for loose stacking thereon. Cardboard cores may be placed in an upright position on a pallet with the tires loosely stacked around the cardboard core. These methods require large shipping space and repeated loading and unloading and time-consuming handling before they reach the point of use.

Attempts to reduce space include bundling wherein tires are placed in a row and endwise pressure applied to shorten the row and then the tires are secured in compressed condition by plastic bands. The bundles often become broken and shift during transporting same with the shifting of the bundles making it substantially impossible to unload the bundles of tires mechanically and efficiently. Such bundled tires are also difficult to store and handle as the bundles shift and become uneven. Also, the tires become warm from normal transportation and warehouse temperatures and then expand breaking the banding and spill out over the storage area. High temperatures also cause the tires within the bundles to expand whereby the plastic banding damages exterior tires.

The principal objects of the present invention are: to provide an adjustable material-handling pallet substantially reducing the aforesaid difficulties and particularly adapted to receive a plurality of vehicle tires in a row therein, compress said tires by reducing the length of the pallet and maintaining the tires in a compressed condition therein during shipping; to provide such a pallet which is adaptable to be adjusted in length and width and height whereby a plurality of rows of vehicle tires may be stored and shipped therein; to provide such a pallet having a base panel extending between upright end panels with the base panel having a plurality of telescoping members and the end panels each having a plurality of telescoping uprights and telescoping transverse members; to provide such an adjustable pallet adapted to be stacked vertically with a plurality of similar pallets; to provide such an adjustable pallet wherein the tires therein are protected from damage by the pallet itself and which is simple and positive in operation, and economical to manufacture.

FIG. 1 is a perspective view of an adjustable material handling pallet embodying features of the present invention.

FIG. 2 is an end elevational view of the pallet showing an alternate position in broken lines.

FIG. 3 is a side elevational view of the pallet showing an alternate position in broken lines.

FIG. 4 is an enlarged fragmentary perspective view of means for vertically stacking the pallet with similar pallets.

FIG. 5 is an enlarged fragmentary sectional view taken on line 5-5, FIG. 2.

FIG. 6 is an enlarged perspective view of one of a plurality of retaining bars.

FIG. 7 is a perspective view of a modified pallet particularly adapted for use in compressing vehicle tires for shipping and storage.

FIG. 8 is a side elevational view of the modified pallet.

FIG. 9 is a sectional view taken on line 9-9, FIG. 7 showing an end member of the modified pallet.

Referring more in detail to the drawings:

The reference numeral 1 generally designates an adjustable material-handling pallet having a base panel 2 extending between longitudinally spaced upright end members in the form of panels 3 and 4, said panels being variable in certain dimensions wherein the pallet 1 is adapted to be adjusted in length, width, and height. The pallet 1 is particularly adapted to be used for storing and shipping vehicle tires 5 placed in rows extending between the upright end panels 3 and 4. The tires 5 in the rows may be compressed by reducing the spacing between the end panels 3 and 4 whereby the tires 5 may be shipped and stored in a substantially reduced space.

The base panel 2 has a plurality of laterally spaced telescoping rail sections 7 and 8 preferably in pairs with each pair of rails sections 7 and 8 extending between end members 9 and 10. In the illustrated structure, one of the rail sections, as, for example, the rail section 7, has one end mounted on the end member 9, and the other or free end slidably received within a free end of the other rail section 8 which has the other end thereof secured to the other end member 10 whereby the pallet 1 is adjustable in length.

Each of the end panels 3 and 4 has a plurality of laterally spaced telescoping uprights 11 extending between telescoping transverse members shown as upper and lower telescoping rails 12 and 13 respectively. The uprights 11 are each tubular members having telescoping sections 14 and 15 whereby the end panels 3 and 4 may be adjusted in height and width. In the illustrated structure, each of the telescoping sections 14, has one end mounted on the upper rail 12 and the other or free end slidably received within a free end of the other section 15. The telescoping section 15 has the other end thereof mounted on the lower rail 13.

The other or lower ends of the lower telescoping section 15 are shown as fixedly mounted on the lower rail 13 to provide substantially rigid end panels. The other or lower ends of the lower telescoping section 15 may, however, be hingedly mounted on the lower rail 13 to permit the end panels 3 and 4 to fold into engagement with the base panel 2 thereby allowing the pallet 1 to be stored and shipped in a substantially reduced space.

The telescoping sections 14 and 15 each have a plurality of longitudinally spaced bores 16 and 17 extending transversely through the telescoping sections 14 and 15. The bores 16 and 17 are alignable and are adapted to receive a suitable positioning device, such as a bolt 18, whereby the telescoping sections 14 and 15 are maintained in selected extended or contracted positions whereby the pallet 1 is adjustable in height. The end panels 3 and 4 each have side sections or panel portions each having a pair of the telescoping uprights 11 extending between a portion of the upper rail 12 and a portion of the lower rail 13. The side sections or panel portions are movable toward or away from each other to adjust the width of the end panels 3 and 4 and thereby adjust the width of the width of the pallet 1. In the illustrated structure, the upper and lower rails 12 and 13 of the end panels 3 and 4 are tubular members and each portion thereof has an open free end which is adapted to receive a spacing rail 19 in facing ends of the rail portions. One of the side sections has a plurality of longitudinally spaced bores 20 extending transversely through the portions of the upper and lower rails 12 and 13 thereof. The bores 20 are alignable with longitudinally spaced bores 21 extending transversely through the spacing rail 19 to receive a suitable positioning device, such as a bolt 22 whereby the spacing between the side sections may be adjusted and maintained. The other end of the spacing rail 19 is received and mounted within the free end of the upper and lower rails 12 and 13 of the other side section.

The adjustable pallet 1 is adapted to be stacked vertically with a plurality of similar pallets by mounting a plurality of pins 23 on the upper rails 12 of the end panels 3 and 4. The stacking pins 23 are positioned to be received in bores 24 through the end members 9 and 10 of the base panel 2. The end members 9 and 10 of the upper pallet are suitably positioned above the end members 9 and 10 of the lower pallet by receiving the pins 23 in the bores 24 therethrough.

When a plurality of tires 5 are placed within the pallet 1 and the spacing between the end panels 3 and 4 is reduced thereby compressing the tires and the compressing force is removed, the upper rails 12 of the end panels 3 and 4 tend to be moved outwardly away from each other in response to the force of the tires 5 attempting to return to an uncompressed condition.

It is therefore necessary to retain the spacing between the upper and lower rails 12 and 13 of the end panels 3 and 4. In the illustrated structure, suitable retaining means, such as retaining bars 25 each have one end removably mounted in the spacing rail 19 of the upper and lower rails 12 and 13 of the end panels 3 and 4 to maintain selected spacings therebetween.

The retaining bars 25 each have an elongate bar 26 having a retaining member or portion, such as a plate 27, mounted on one end thereof for engaging one of the end panels, as for example end panel 4. Suitable abutment means, such as a tubular member 28, is fixably mounted on the elongate bar 26 intermediate the ends thereof. A sleeve 29 is movably mounted on the elongate bar 26 for movement therealong to engage the abutment member 28 when the retaining means is in an extended position, as later described. A slide bar 30 has one end fixably mounted on the sleeve 29 and is slidable relative the elongate bar 26. The slide bar 30 extends through the tubular abutment member 28 whereby the slide bar 30 is guided in spaced substantially parallel relation with the elongate bar 26 during movement of the sleeve 29 therealong.

The other ends of the elongate bar 26 and slide bar 30 are adapted to releasably engage within the other end panel 3. In the illustrated structure, the other ends of the elongate bar 26 and slide bar 30 are enlarged portions, each having a recess 31 in an exterior surface thereof to receive a cam member 32 rotatably mounted on the other end panel 3.

In the illustrated structure, in holding the tires in compressed position the retaining bars 25 each are extended through an opening 33 in the spacing rail 19 in the end panel 4 and the plate 27 engages the exterior surface thereof with the cam members 32 being mounted on the exterior surface of the opposed spacing rail 19 in the other end panel 3 and moved into the recesses 31 of the elongate bar 26 and slide bar 30. The enlarged end portions of the bars 26 and 30 are inserted through openings 34 in the spacing rail 19 in the other end panel 3 to a position to be engaged by the cam members 32 mounted on the exterior surface of the spacing rail 19. When it is desired to store the tires and the pallet in a less compressed condition, the cam member 32 is removed from the recess 31 in the elongate bar 26 thereby allowing the end panels to separate until the sleeve 29 engages the abutment member 28 and the recess 31 in the slide bar 30 remains engaged with its respective cam member 32 with the sleeve 29 thereby maintaining a selected spacing between the end panels.

In use, the width of the end panels 3 and 4 and base panel 2 is adjusted and the bolts 22 are mounted in the bores 20 and 21 of the upper and lower rails 12 and 13 and the spacing rails 19 respectively. The pallet 1 is prepared to receive the tires 5 placed in a row or rows 6'. The length of the pallet 1 is then reduced by placing same in a suitable machine (not shown) which is adapted to compress the pallet 1 and the tires 5 therein thereby placing the tires therein in compression which reduces the space required to store and ship same. The retaining bars 25 are mounted in the upper and lower rails 12 and 13 of the end panels 3 and 4 thereby maintaining the spacing between the upper and lower rails 12 and 13 of the end panels 3 and 4. Upon arrival of the compressed pallet at its destination, the retaining bars 25 are released to permit the end panels to separate sufficiently to allow the tires therein to return to an uncompressed condition. After a selected time period the pallet and tires therein are partially recompressed for extended storage and the retaining bars 25 are mounted in their extended or storage position.

The upper rails 12 of the end panels 3 and 4 may be adjusted to a height whereby sidewalls of the tires 5 in an upper row or rows 6'' engage the upper rails 12. The bolts 18 are extended through and secured in the bores 16 and 17 in the uprights 11 thereby maintaining the adjusted height of the end panels 3 and 4.

FIGS. 7 to 9, inclusive, illustrate a modified adjustable pallet 35 particularly adapted to compress a single row 36 of tires 37 for shipping and storing same. The modified pallet 35 includes spaced end members 38 and 39 with a pair of telescoping rails 40 extending therebetween. Stacking rods 41 are extendable outwardly from exterior surfaces of the end members 38 and 39 for engaging a suitable support 42 for stacking a plurality of the pallets 35.

The end members 38 and 39 are each circular members and each have a center disc 44 received in an exterior disc 45. The exterior disc 45 has an offset portion 46 for receiving and supporting the center disc 44 and to conform to the general shape of the sidewall of the tires 37 at the ends of the row 36. The offset portions 46 extend into the center opening in the tires 37 and the exterior disc 45 engages the exterior sidewall of end tires 37.

The telescoping rails 40 are tubular members and each have telescoping sections 47 and 48. In the illustrated structure, one of the telescoping sections, as for example section 47, has one end mounted on the center disc 44 of one of the end members, as for example, end member 38, and the other or free end received within an open or free end of the other telescoping section 48. The telescoping section 48 has the other end thereof mounted on the center disc 44 of the other end member 39. A bore 49 extends through each center disc 44 and is aligned with the respective sections 47 and 48 whereby the stacking rods 41 may be received therein.

In use, the tires 37 are positioned in the row 36 and the telescoping sections 47 and 48 are inserted through the center opening of the tires from opposite ends of the row 36. The pallet 35 and the tires 37 are placed in a suitable machine (not shown) which is adapted to reduce the spacing between the end members 38 and 39 thereby compressing the tires 37 therein. Suitable retaining means, such as an elongate flexible chain 50 has opposite ends engaged with the center disc 44 of each of the end members 38 and 39 thereby maintaining the spacing therebetween and thereby resisting the pressure exerted by the tires 37 attempting to return to an uncompressed condition.

The pallets 1 and 35 are particularly adapted to a novel method of shipping and storing vehicle tires wherein a plurality of vehicle tires are placed in at least one row therein and the respective pallet 1 or 35 is placed in a machine (not shown) which compresses the respective pallet and the tires therein by reducing the spacing between end portions of the respective pallet. The respective pallet 1 or 35 is maintained in such a compressed condition during shipping and storing the pallet and the tires therein.

Prolonged storage of vehicle tires in a highly compressed condition may cause set or otherwise cause damage to the tires, therefore, for storage the tires in the pallet are adjusted or released by adjusting the length of the respective pallet. The preferred method of adjusting the spacing between the end portions is by placing the pallet in a similar machine (not shown) and moving the end portions toward each other whereby the respective retaining means may be disconnected and then allowing the respective pallet to expand to a less compressed condition or return to its original condition thereby allowing the tires therein to partially decompress or return to an uncompressed condition respectively. After a selected time period the pallet and the tires therein are partially recompressed whereby same may be stored in a substantially reduced space as compared to uncompressed tires.

It is to be understood that, while I have illustrated and described certain forms of my invention, it is not to be limited to these specific forms or arrangements herein described and shown.

I claim:

1. A structure for containing vehicle tires during shipping and storage including:
   a. spaced end members adapted to receive vehicle tires in a side-by-side row therebetween, said end members each being circular and each having a center disc and an exterior disc said exterior disc having an offset portion therein for receiving said center disc therein;

b. a telescoping frame structure between said end members, said frame structure having laterally spaced elongate first portions having ends fixed to one end member and laterally spaced elongate second portions with ends fixed to the other end member with the free end portions of said first and second frame members slidably engaged for extension and contraction, said frame structure contracting in response to endwise pressure on said end members compressing tires therebetween;

c. said telescoping frame structure having a pair of telescoping rails each having opposite ends mounted on facing surfaces of said center disc, and d. elongate means extending between the end members and connected relative thereto for retaining the structure in contracted position with tires compressed between the end members.

2. A structure for containing a compressed row of vehicle tires for storage and shipping thereof comprising:

a. a first member adapted to engage an outside sidewall of an endmost vehicle tire at one end of a side-by-side row of such tires;

b. a second member adapted to engage an outside sidewall of the endmost vehicle tire at the opposite end of said side-by-side row of such tires;

c. laterally spaced elongate members having portions connected to the first member with said elongate members extending therefrom along said row of vehicle tires;

d. laterally spaced elongate members having portions connected to said second member and extending therefrom, said elongate members connected to said first and second members having cooperative relationship to retain said first and second members against relative movement transversely of said row of vehicle tires;

e. connecting means extending between said first and second members; and f. cooperative fastening means on said connecting means operative to retain said first and second members in fixed position relative to each other with a row of vehicle tires compressed therebetween and applying outward force on said first and second members.

3. The structure as set forth in claim 2 and including:

a. said fastening means being releasable whereby the vehicle tires may expand elongating the row of vehicle tires, and increasing the spacing between said first and second members; and b. stop means connected with said fastening and connecting means limiting the movement of the first and second members and retaining same in a spaced relationship in which the row of vehicle tires are compressed to a lesser degree than before the release of said fastening means.

4. A structure as set forth in claim 2 wherein a. the first and second members are each upright end panels having a plurality of laterally spaced uprights;

b. a base panel extends between lower edges of the first and second members and said elongate members having portions connected to said first and second members are longitudinal rails of the base panel and are relatively movable to adjust the spacing of the first and second members;

c. said end panels each being adjustable for changing the dimension in a direction transversely of the row of vehicle tires; and d. said base panel being adjustable laterally for changing the width thereof.

5. The structure as set forth in claim 4 wherein:

a. said end panels each have an upper and a lower telescoping rail with said uprights extending therebetween whereby said end panels are adjustable laterally; and b. said base panel has end members mounted at each end of said rails, said end members each having one of said lower rails of said end panels mounted thereon whereby said base panel is adjustable laterally.

6. The structure as set forth in claim 5 wherein:

a. said uprights in each of said end panels are each telescoping members whereby said end panels are adjustable longitudinally; and b. said rails in said base panel are each telescoping members whereby said base panel is adjustable longitudinally.

7. The structure as set forth in claim 3 wherein said connecting and fastening means includes:

a. an elongate bar having one end mounted on one of said end panels;

b. abutment means mounted on said elongate bar intermediate the ends thereof;

c. sleeve means movably mounted on said elongate bar and engageable with said abutment means;

d. a second elongate bar spaced from said first named bar and having one end mounted on said sleeve means; and e. means on said other end panel for releasably engaging the other ends of said first named bar and said second bar.

8. The adjustable material handling pallet as set forth in claim 7 wherein:

a. said other ends of said first named bar and said second bar are each enlarged portions;

b. said enlarged portions each have a recess therein; and c. said releasably engaging means are rotatably mounted cams engageable within said recesses.

9. A method of shipping and storing vehicle tires comprising:

a. racking a plurality of vehicle tires in a row wherein said tires are in a side-by-side relationship and in substantially rigid alignment;

b. compressing said row of tires longitudinally of said row and retaining said row of tires in such compressed and rigid alignment condition;

c. shipping said row of tires while maintaining the rigid alignment and compressed condition thereof;

d. changing the compression of said row of tire to a reduced compression while maintaining said row in rigid alignment; and e. storing said tires while maintaining said row of tires in said condition of reduced compression and alignment.